(12) United States Patent  (10) Patent No.: US 11,675,614 B2
Von Niederhausern et al.  (45) Date of Patent: Jun. 13, 2023

(54) STANDARDIZED MODEL PACKAGING AND DEPLOYMENT

(71) Applicant: SPARKCOGNITION, INC., Austin, TX (US)

(72) Inventors: Eugene Von Niederhausern, Rosenberg, TX (US); Sreenivasa Gorti, Austin, TX (US); Kevin W. DiVincenzo, Pflugerville, TX (US); Sridhar Sudarsan, Austin, TX (US)

(73) Assignee: SPARKCOGNITION, INC., Austin, TX (US)

( * ) Notice: Subject to any disclaimer, the term of this patent is extended or adjusted under 35 U.S.C. 154(b) by 0 days.

(21) Appl. No.: 17/176,889

(22) Filed: Feb. 16, 2021

(65) Prior Publication Data

US 2021/0255839 A1 Aug. 19, 2021

Related U.S. Application Data

(60) Provisional application No. 62/976,965, filed on Feb. 14, 2020.

(51) Int. Cl.
| | |
|---|---|
| *G06F 8/60* | (2018.01) |
| *G06F 9/455* | (2018.01) |
| *G06F 11/34* | (2006.01) |
| *G06F 9/48* | (2006.01) |
| *G06F 9/50* | (2006.01) |
| *G06F 8/35* | (2018.01) |
| *G06F 8/41* | (2018.01) |
| *G06F 8/52* | (2018.01) |
| *G06F 16/903* | (2019.01) |

(Continued)

(52) U.S. Cl.
CPC ............ *G06F 9/45558* (2013.01); *G06F 8/35* (2013.01); *G06F 8/433* (2013.01); *G06F 8/52* (2013.01); *G06F 8/60* (2013.01); *G06F 9/4881* (2013.01); *G06F 9/5077* (2013.01); *G06F 11/3447* (2013.01); *G06F 16/211* (2019.01); *G06F 16/90335* (2019.01); *G06N 5/04* (2013.01); *G06N 20/00* (2019.01); *G06F 2009/4557* (2013.01)

(58) Field of Classification Search
CPC ............ G06F 11/3447; G06F 11/3688; G06F 16/211; G06F 16/90335; G06F 2009/4557; G06F 8/60; G06N 20/00; G06N 5/04
See application file for complete search history.

(56) References Cited

U.S. PATENT DOCUMENTS

2012/0290560 A1* 11/2012 Das ........................... G06F 8/71
707/722
2019/0042283 A1* 2/2019 Urbach ............... G06F 9/44526
(Continued)

OTHER PUBLICATIONS

E. Kusmenko, S. Nickels, S. Pavlitskaya, B. Rumpe and T. Timmermanns, "Modeling and Training of Neural Processing Systems," 2019 ACM/IEEE 22nd International Conference on Model Driven Engineering Languages and Systems (MODELS), 2019, pp. 283-293, doi: 10.1109/MODELS.2019.00012. (Year: 2019).*
(Continued)

*Primary Examiner* — Hanh Thi-Minh Bui

(57) ABSTRACT

Standardized model packaging and deployment, including: generating a model package comprising: model definition data for a model; function code facilitating execution of the model; and at least one interface for at least one operating system.

18 Claims, 5 Drawing Sheets

(51) Int. Cl.
  *G06N 20/00* (2019.01)
  *G06F 16/21* (2019.01)
  *G06N 5/04* (2023.01)

(56) References Cited

U.S. PATENT DOCUMENTS

2019/0042887 A1* 2/2019 Nguyen ............... G06F 18/2148
2019/0155633 A1* 5/2019 Faulhaber, Jr. .......... G06N 5/04
2019/0279114 A1* 9/2019 Deshpande ............ G06N 20/00
2020/0004575 A1* 1/2020 Bailey ................. G06F 9/45558
2020/0026736 A1* 1/2020 Reddy ....................... G06F 8/24
2021/0150411 A1* 5/2021 Coenders ............. G06K 9/6256

OTHER PUBLICATIONS

S. Zhao et al. "Packaging and Sharing Machine Learning Models via the Acumos AI Open Platform," 2018 17th IEEE International Conference on Machine Learning and Applications (ICMLA), Orlando, FL, USA, 2018, pp. 841-846. (Year: 2018).*

* cited by examiner

Packaging Module 104

Generate A Model Package Comprising Model Definition Data For A Model, Function Code Facilitating Execution Of The Model, And At Least One Interface For At Least One Operating System 302

FIG. 3

STANDARDIZED MODEL PACKAGING AND DEPLOYMENT

CROSS-REFERENCE TO RELATED APPLICATIONS

This application is a non-provisional application for patent entitled to a filing date and claiming the benefit of earlier-filed U.S. Provisional Patent Application Ser. No. 62/976,965, filed Feb. 14, 2020.

This application is related to co-pending U.S. patent application Ser. No. 17/176,906, filed Feb. 16, 2021, and co-pending U.S. patent application Ser. No. 17/176,898, filed Feb. 16, 2021, each of which is incorporated by reference in their entirety.

BACKGROUND

In data science applications, models such as machine learning models may be used to generate predictions based on various input data. Depending on the particular user or customer executing these models, both the models and associated functional code may need to be executed on a variety of operating systems and environments. Accordingly, functional code written in an arbitrary programming language must be able to both interact with the model and any operating system or environment to which it is deployed.

BRIEF DESCRIPTION OF THE DRAWINGS

FIG. 3 is a flowchart of an example method for standardized model packaging and deployment according to some embodiments.

DETAILED DESCRIPTION

The terminology used herein for the purpose of describing particular examples is not intended to be limiting for further examples. Whenever a singular form such as "a", "an" and "the" is used and using only a single element is neither explicitly nor implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

It will be understood that when an element is referred to as being "connected" or "coupled" to another element, the elements may be directly connected or coupled via one or more intervening elements. If two elements A and B are combined using an "or", this is to be understood to disclose all possible combinations, i.e., only A, only B, as well as A and B. An alternative wording for the same combinations is "at least one of A and B". The same applies for combinations of more than two elements.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

In data science applications, models such as machine learning models may be used to generate predictions based on various input data. Such predictions may include, for example, classifications for classification problems or numerical values for regression problems. Depending on the particular user or customer executing these models, both the models and associated functional code may need to be executed on a variety of operating systems and environments. Accordingly, functional code written in an arbitrary programming language must be able to both interact with the model and any operating system or environment to which it is deployed.

Figure 1:
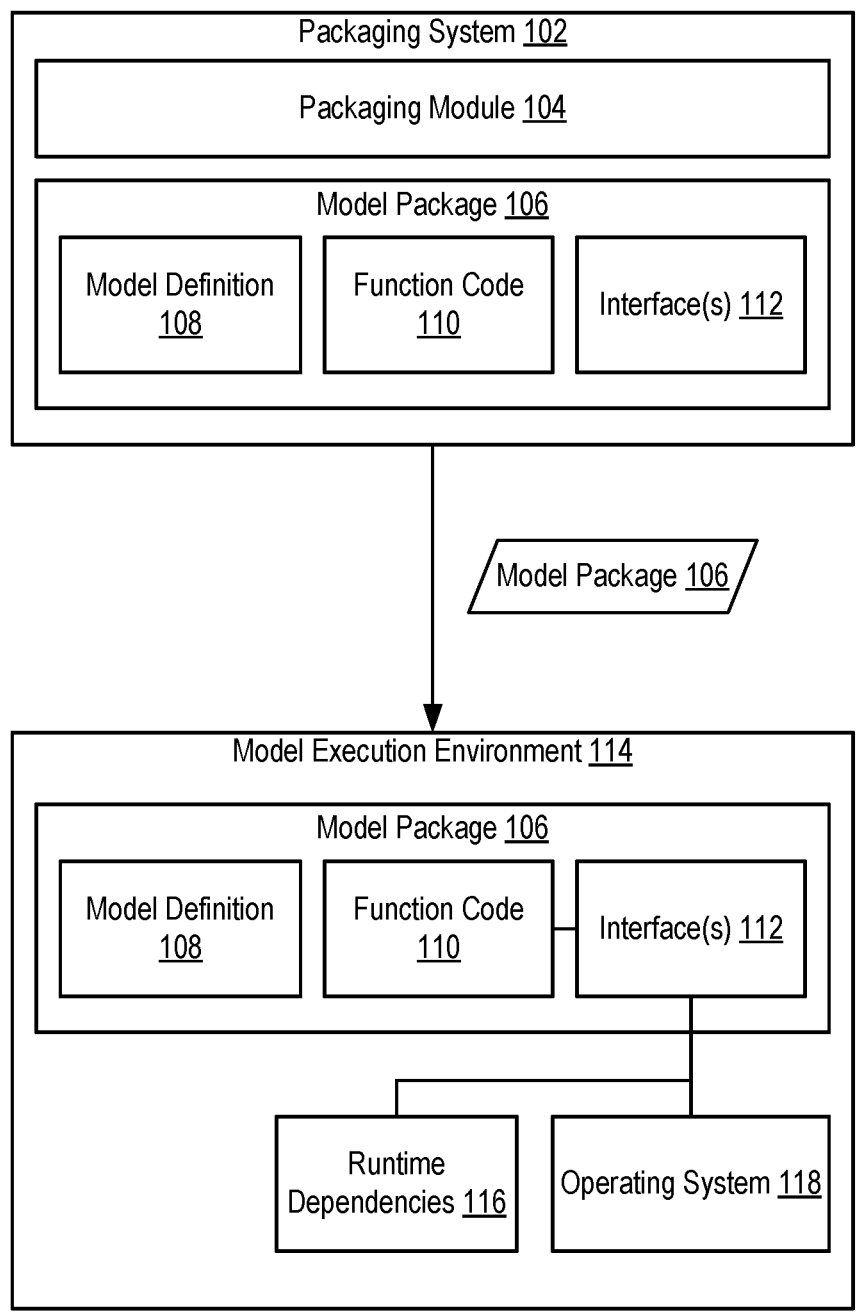
FIG. 1 is a block diagram of an example system for standardized model packaging and deployment according to some embodiments.

To address these concerns, FIG. 1 sets forth an example system for standardized model packaging and deployment according to embodiments of the present disclosure. The example system of FIG. 1 includes a packaging system 102. The packaging system 102 includes a packaging module 104 configured to generate model package 106 for deployment to a particular system for execution. The model package 106 may be embodied as, for example, a container (e.g., a containerized application), a virtual machine (VM) (e.g., a micro-VM), or otherwise embodied.

A generated model package 106 includes a model definition 108. The model definition 108 encodes the various topological, structural, and/or architectural relationships, calculations, weights, functions (e.g., node activation or aggregation functions), thresholds, and the like for a model. In other words, the model definition 108 is an encoding of a particular model. As an example, the model definition 108 may be generated by training a particular machine learning model based on input training data. The trained model may then be encoded or exported as a model definition 108 embodying the particular training of the model. One skilled in the art will appreciate that, though the packaging module 104 generates a model package 106 that includes the model definition 108, the model training and generating the model definition 108 may not necessarily be performed in the packaging system 102. For example, the particular model definition 108 may be generate by another entity and provided to the packaging system 102 for inclusion in a generated model package 106.

The model definition 108 may be encoded using a model definition language (MDL). For example, the model definition 108 may be encoded using a standardized, predefined, or otherwise preselected MDL required by the packaging module 104 to encode model definitions 108. In some embodiments, the model definition 108 may include bindings to one or more programming languages. A binding to a particular programming language is a portion of the model definition 108 (e.g., a portion of MDL code or other code) that enables functions or operations written in the particular programming language to access or execute portions of the model as embodied in the model definition 108. By including bindings to potentially multiple programming languages, a model encoded by the model definition 108 is potentially usable with code written in multiple, arbitrary programming languages. The model definition 108 may also include code or functions (e.g., written in the MDL or included as part of a binding to a particular programming language) or one or more runtime dependencies 116. A runtime dependency 116 is a particular portion of code or data necessarily present in order to execute functional portions of the model package 106. Accordingly, a given runtime dependency 116 indicated in the model definition 108 may be a dependency required by the model definition 108 for proper execution (e.g., independent of or not specifically required by function code 110 described below). In some embodiments, the runtime dependencies 116 indicated in the model definition 108 may be excluded from the model package 106.

The model package 106 generated by the packaging module 104 also includes function code 110. The function code 110 is code written in a particular programming language for execution of particular functions by the model package 106. The function code 110 may include compiled, executable code, uncompiled program code, or interpreted code (e.g., Python). The function code 110 may embody particular functional interactions with the model definition 108. In other words, the function code 110 defines a particular function or application that accesses or relies on the model definition 108 to perform particular operations. Accordingly, the function code 110 may provide particular data to a model defined by the model definition 108, may receive output from the model, may transform or otherwise present input to or output from the model, and the like. In some embodiments, the function code 110 is written in a particular programming language to which the model definition 108 has a programming language-specific binding.

In some embodiments, the function code 110 indicates one or more runtime dependencies 116. Accordingly, a given runtime dependency 116 indicated in the function code 110 may be a dependency required by the function code 110 for proper execution (e.g., independent of or not specifically required by the model definition 108). In some embodiments, the runtime dependencies 116 indicated in the function code 110 may be excluded from the model package 106.

In order for the function code 110 to be executed in a particular environment or on a particular operating system 118, the model package 106 includes one or more interfaces 112. The interfaces 112 are binary-level system bridges between the function code 110 and a given operating system 118 or virtual machine executing the function code 110. For example, in some embodiments, a given interface 112 may include an Application Binary Interface (ABI). As another example, in some embodiments, a given interface 112 may include a Foreign Function Interface (FFI). In some embodiments, the model package 106 may include a specific interface 112 for a predefined or preselected operating system 118, virtual machine, or environment. For example, a specific interface 112 may be selected or requested by a client or user managing deployment of the model package 106. In other embodiments, the model package 106 may include multiple interfaces 112 for multiple environments to allow for greater portability of the model package 106. A particular required interface 112 may then be selected and used during execution of the model package 106.

In some embodiments, after generating the model package 106, the packaging module 104 or another component of the packaging system 102 may provide the model package 106 to a model execution environment 114 for execution. The model execution environment 114 executes the model package 106 by virtue of the function code 110 interfacing with an operating system 118 of the model execution environment 114 via one or more of the interfaces 112. In some embodiments, the model execution environment 114 includes one or more runtime dependencies 116 (e.g., required by the model definition 108 or the function code 110).

One skilled in the art will recognize the benefits of the packaging system 102 in that it enables a model (embodied as a model definition 108) to be packaged and deployed to any model execution environment 114 with function code 110 written in an arbitrary programming language. This allows for easy deployment, updating, and maintenance of models across various model execution environments 114. Regardless of who builds the model, the packaging system 102 can access, and include in a model package 106, the recipe for data transformations used to feed data into a model, the model itself, and either a reference to or a copy of the full data set from which the model is built.

Figure 2:
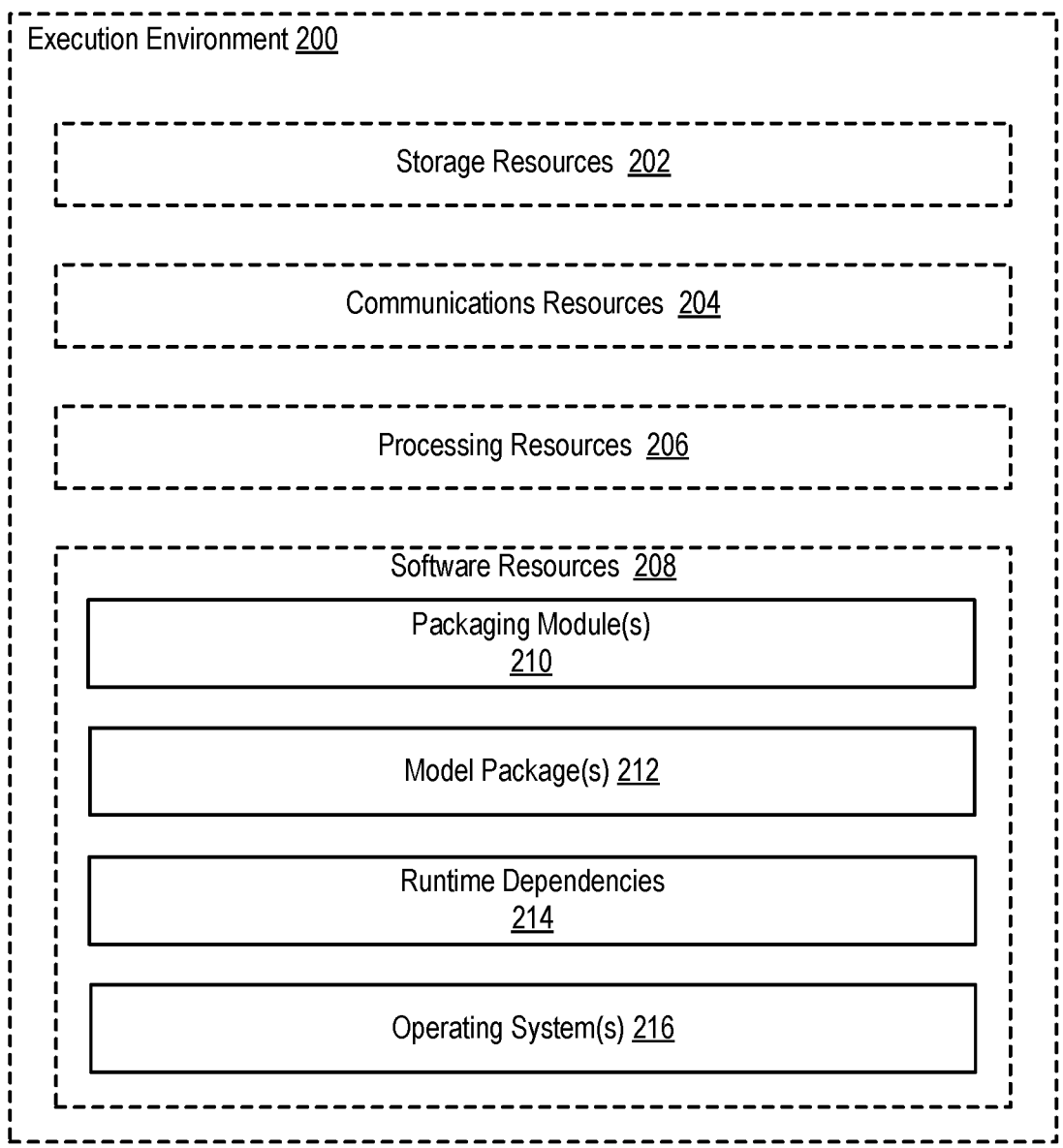
FIG. 2 is a flowchart of another example execution environment for standardized model packaging and deployment according to some embodiments.

For further explanation, FIG. 2 sets forth a diagram of an execution environment 200 for standardized model packaging and deployment in accordance with some embodiments of the present disclosure. The execution environment 200 may be used to implement various components of the example system of FIG. 1, including the packaging system 102, the model execution environment 114, and the various subcomponents thereof. The execution environment 200 depicted in FIG. 2 may be embodied in a variety of different ways. The execution environment 200 may be provided, for example, by one or more cloud computing providers such as Amazon Web Services (AWS), Microsoft Azure, Google Cloud, and others, including combinations thereof. Alternatively, the execution environment 200 may be embodied as a collection of devices (e.g., servers, storage devices, networking devices) and software resources that are included in a private data center. In fact, the execution environment 200 may be embodied as a combination of cloud resources and private resources that collectively form a hybrid cloud computing environment.

The execution environment 200 depicted in FIG. 2 may include storage resources 202, which may be embodied in many forms. For example, the storage resources 202 may include flash memory, hard disk drives, nano-RAM, non-volatile memory (NVM), 3D crosspoint non-volatile memory, magnetic random access memory (MRAM), non-volatile phase-change memory (PCM), storage class memory (SCM), or many others, including combinations of the storage technologies described above. Readers will appreciate that other forms of computer memories and storage devices may be utilized as part of the execution environment 200, including DRAM, static random access memory (SRAM), electrically erasable programmable read-only memory (EEPROM), universal memory, and many others. The storage resources 202 may also be embodied, in embodiments where the execution environment 200 includes resources offered by a cloud provider, as cloud storage resources such as Amazon Elastic Block Storage (EBS) block storage, Amazon S3 object storage, Amazon Elastic File System (EFS) file storage, Azure Blob Storage, and many others. The example execution environment 200 depicted in FIG. 2 may implement a variety of storage architectures, such as block storage where data is stored in blocks, and each block essentially acts as an individual hard drive, object storage where data is managed as objects, or file storage in which data is stored in a hierarchical structure. Such data may be saved in files and folders, and presented to both the system storing it and the system retrieving it in the same format.

The execution environment 200 depicted in FIG. 2 also includes communications resources 204 that may be useful in facilitating data communications between components within the execution environment 200, as well as data communications between the execution environment 200 and computing devices that are outside of the execution environment 200. Such communications resources may be embodied, for example, as one or more routers, network switches, communications adapters, and many others, including combinations of such devices. The communications resources 204 may be configured to utilize a variety of different protocols and data communication fabrics to facilitate data communications. For example, the communications resources 204 may utilize Internet Protocol (IP) based technologies, fibre channel (FC) technologies, FC over ethernet (FCoE) technologies, InfiniBand (IB) technologies, NVM Express (NVMe) technologies and NVMe over fabrics (NVMeoF) technologies, and many others. The communications resources 204 may also be embodied, in embodiments where the execution environment 200 includes resources offered by a cloud provider, as networking tools and resources that enable secure connections to the cloud as well as tools and resources (e.g., network interfaces, routing tables, gateways) to configure networking resources in a virtual private cloud. Such communications resources may be useful in facilitating data communications between components within the execution environment 200, as well as data communications between the execution environment 200 and computing devices that are outside of the execution environment 200.

The execution environment 200 depicted in FIG. 2 also includes processing resources 206 that may be useful in useful in executing computer program instructions and performing other computational tasks within the execution environment 200. The processing resources 206 may include one or more application-specific integrated circuits (ASICs) that are customized for some particular purpose, one or more central processing units (CPUs), one or more digital signal processors (DSPs), one or more field-programmable gate arrays (FPGAs), one or more systems on a chip (SoCs), or other form of processing resources 206. The processing resources 206 may also be embodied, in embodiments where the execution environment 200 includes resources offered by a cloud provider, as cloud computing resources such as one or more Amazon Elastic Compute Cloud (EC2) instances, event-driven compute resources such as AWS Lambdas, Azure Virtual Machines, or many others.

The execution environment 200 depicted in FIG. 2 also includes software resources 208 that, when executed by processing resources 206 within the execution environment 200, may perform various tasks. The software resources 208 may include, for example, one or more modules of computer program instructions that when executed by processing resources 206 within the execution environment 200 are useful for standardized model packaging and deployment. As an example, the software resources 208 may include packaging module(s) 210, model package(s) 212, runtime dependencies 214, or operating system(s) 216 as can be appreciated.

For further explanation, FIG. 3 sets forth a flow chart illustrating an example method for standardized model packaging and deployment according to embodiments of the present disclosure that includes generating 302 (e.g., by a packaging module 104) a model package 106 comprising model definition 108 data for a model, function code 110 facilitating execution of the model, and at least one interface 112 for at least one operating system 118. The model package 106 may be embodied as, for example, a container (e.g., a containerized application), a virtual machine (VM) (e.g., a micro-VM), or otherwise embodied.

The model definition 108 encodes the various relationships, calculations, weights, thresholds, and the like for a model. In other words, the model definition 108 is an encoding of a particular model. As an example, the model definition 108 may be generated by training a particular machine learning model based on input training data. The trained model may then be encoded or exported as a model definition 108 embodying the particular training of the model. One skilled in the art will appreciate that, though the packaging module 104 generates a model package 106 that includes the model definition 108, the model training and generating the model definition 108 may not necessarily be performed in the packaging system 102. For example, the particular model definition 108 may be generated by another entity and provided to the packaging system 102 for inclusion in a generated model package 106.

The model definition 108 may be encoded using a model definition language (MDL). For example, the model definition 108 may be encoded using a standardized, predefined, or otherwise preselected MDL required by the packaging module 104 to encode model definitions 108. In some embodiments, the model definition 108 may include bindings to one or more programming languages. A binding to a particular programming language is a portion of the model definition 108 (e.g., a portion of MDL code or other code) that allows functions or operations written in the particular programming language to access or execute portions of the model as embodied in the model definition 108. By including bindings to potentially multiple programming languages, a model encoded by the model definition 108 is potentially usable with code written in multiple, arbitrary programming languages. The model definition 108 may also include code or functions (e.g., written in the MDL or included as part of a binding to a particular programming language) one or more runtime dependencies 116. A runtime dependency 116 is a particular portion of code or data necessarily present in order to execute functional portions of the model package 106. Accordingly, a given runtime dependency 116 indicated in the model definition 108 may be a dependency required by the model definition 108 for proper execution (e.g., independent of or not specifically required by function code 110 described below). In some embodiments, the runtime dependencies 116 indicated in the model definition 108 may be excluded from the model package 106.

The function code 110 is code written in a particular programming language for execution of particular functions by the model package 106. The function code 110 may include compiled, executable code, uncompiled program code, or interpreted code (e.g., Python). The function code 110 may embody particular functional interactions with the model definition 108. In other words, the function code 110 defines a particular function or application that accesses or relies on the model definition 108 to perform particular operations. Accordingly, the function code 110 may provide particular data to a model defined by the model definition 108, may receive output from the model, may transform or otherwise present input to or output from the model, and the like. In some embodiments, the function code 110 is written in a particular programming language to which the model definition 108 has a programming language-specific binding.

In some embodiments, the function code 110 indicates one or more runtime dependencies 116. Accordingly, a given runtime dependency 116 indicated in the function code 110 may be a dependency required by the function code 110 for proper execution (e.g., independent of or not specifically required by the model definition 108). In some embodiments, the runtime dependencies 116 indicated in the function code 110 may be excluded from the model package 106.

The interfaces 112 are binary-level system bridges between the function code 110 and a given operating system 118 or virtual machine executing the function code 110. For example, in some embodiments, a given interface 112 may include an Application Binary Interface (ABI). As another example, in some embodiments, a given interface 112 may include a Foreign Function Interface (FFI). In some embodiments, the model package 106 may include a specific interface 112 for a predefined or preselected operating system 118, virtual machine, or environment. For example, a specific interface 112 may be selected or requested by a client or user managing deployment of the model package 106. In other embodiments, the model package 106 may include multiple interfaces 112 for multiple environments to allow for greater portability of the model package 106. A particular required interface 112 may then be selected and used during execution of the model package 106.

The model package 106 may also include other data. For example, the model package 106 may include training data used to generate the model. The model package 106 may also include a reference to the training data used to generate the model. The model package 106 may also include data indicating one or more transformations applied to data input to the model.

Figure 4:
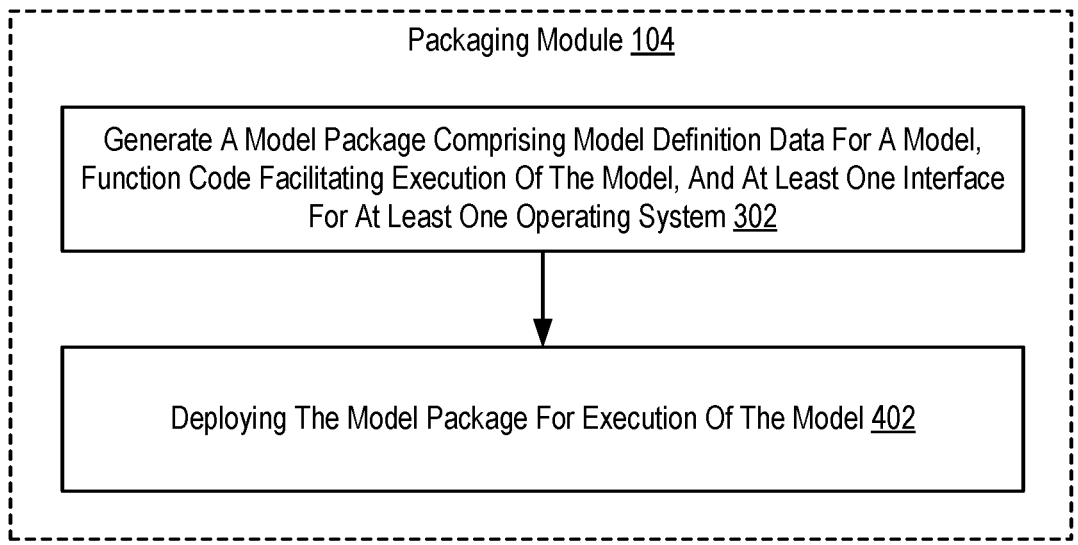
FIG. 4 is a flowchart of another example method for standardized model packaging and deployment according to some embodiments.

For further explanation, FIG. 4 sets forth a flow chart illustrating another example method for standardized model packaging and deployment according to embodiments of the present disclosure. The method of FIG. 4 is similar to FIG. 3 in that the method of FIG. 4 includes generating 302 (e.g., by a packaging module 104) a model package 106 comprising model definition 108 data for a model, function code 110 facilitating execution of the model, and at least one interface 112 for at least one operating system 118.

The method of FIG. 4 differs from FIG. 3 in that the method of FIG. 4 includes deploying 402 (e.g., by the packaging module 104) the model package 106 for execution of the model. For example, in some embodiments, after generating the model package 106, the packaging module 104 or another component of the packaging system 102 may provide the model package 106 to a model execution environment 114 for execution. The model execution environment 114 executes the model package 106 by virtue of the function code 110 interfacing with an operating system 118 of the model execution environment 114 via one or more of the interfaces 112. In some embodiments, the model execution environment 114 includes one or more runtime dependencies 116 (e.g., required by the model definition 108 or the function code 110).

Figure 5:
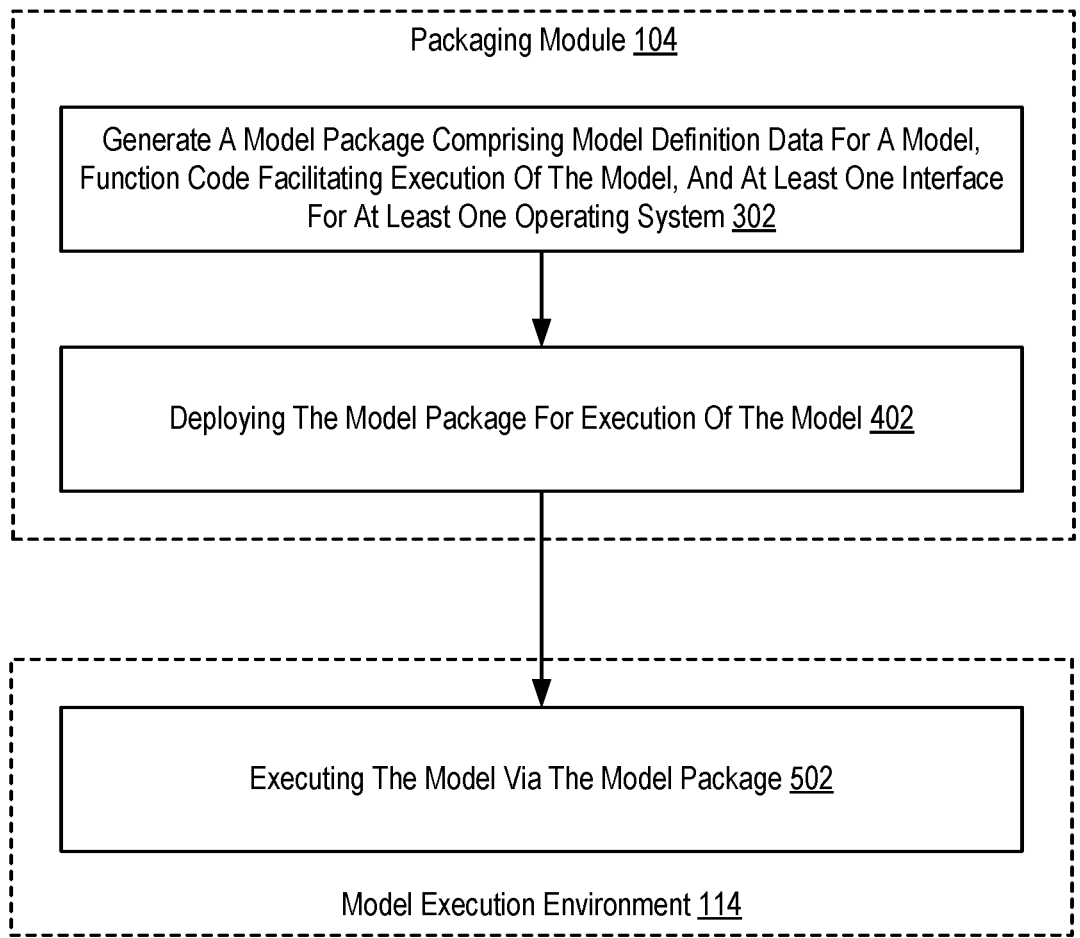
FIG. 5 is a flowchart of another example method for standardized model packaging and deployment according to some embodiments.

For further explanation, FIG. 5 sets forth a flow chart illustrating another example method for standardized model packaging and deployment according to embodiments of the present disclosure. The method of FIG. 5 is similar to FIG. 4 in that the method of FIG. 4 includes generating 302 (e.g., by a packaging module 104) a model package 106 comprising model definition 108 data for a model, function code 110 facilitating execution of the model, and at least one interface 112 for at least one operating system 118; and deploying 402 (e.g., by the packaging module 104) the model package 106 for execution of the model.

The method of FIG. 5 differs from FIG. 4 in that the method of FIG. 5 includes executing 502 (e.g., by the model execution environment 114) the model via the model package 106. For example, executing 502 the model via the model package 106 may include executing an interpreter or other operation to interpret, compile, or otherwise execute the function code 110 in the model package 106. Executing 502 the model via the model package 106 may include executing the function code 110 such that the function code 110 interacts with the operating system 118 or a virtual machine via a particular interface 112 included in the model package 106. Executing 502 the model via the model package 106 may include accessing (e.g., by function code 110 via one or more interfaces 112) one or more runtime dependencies 116 stored on the model execution environment 114.

In view of the explanations set forth above, readers will recognize that the benefits of standardized model packaging and deployment include:

Improved performance of a computing system by allowing for models to be packaged for execution on arbitrary operating systems or environments, and included with program code written in an arbitrary program language.

Exemplary embodiments of the present disclosure are described largely in the context of a fully functional computer system for standardized model packaging and deployment. Readers of skill in the art will recognize, however, that the present disclosure also can be embodied in a computer program product disposed upon computer readable storage media for use with any suitable data processing system. Such computer readable storage media can be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present disclosure.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes can be made in various embodiments of the present disclosure. The descriptions in this specification are for purposes of illustration only and are not to be construed in a limiting sense. The scope of the present disclosure is limited only by the language of the following claims.

What is claimed is:

1. A method implemented by a computing device for standardized model packaging and deployment, the method comprising:
  generating a model package comprising:
    for a model, model definition data that includes a binding to a computer programming language, wherein the model is a trained machine learning model to generate prediction data, wherein the binding enables one or more functions written in the computer programming language to execute one or more portions of the model;
    function code that facilitates execution of the model via the binding;

at least one interface for at least one operating system; and wherein one or more of the model definition data or the function code access one or more runtime dependencies excluded from the model package.

2. The method of claim 1, wherein the model definition data is encoded in a model definition language (MDL).

3. The method of claim 2, wherein the computer programming language encodes the function code.

4. The method of claim 3, wherein the model definition data comprises one or more other bindings to one or more other programming languages.

5. The method of claim 1, wherein the at least one interface comprises an Application Binary Interface (ABI).

6. The method of claim 1, wherein the at least one interface comprises a Foreign Function Interface (FFI).

7. The method of claim 1, further comprising deploying the model package for execution of the model.

8. The method of claim 7, further comprising executing the model via the model package.

9. The method of claim 1, further comprising:
training the model based on input training data; and
wherein generating the model package comprises exporting, after training the model, the model as the model definition data.

10. An apparatus for standardized model packaging and deployment, the apparatus comprising a computer processor, a computer memory operatively coupled to the computer processor, the computer memory having disposed within it computer program instructions that, when executed by the computer processor, cause the apparatus to perform steps comprising:
generating a model package comprising:
for a model, model definition data that includes a binding to a computer programming language, wherein the model is a trained machine learning model to generate prediction data, wherein the binding enables one or more functions written in the computer programming language to execute one or more portions of the model;
function code that facilitates execution of the model via the binding;
at least one interface for at least one operating system; and
wherein one or more of the model definition data or the function code access one or more runtime dependencies excluded from the model package.

11. The apparatus of claim 10, wherein the model definition data is encoded in a model definition language (MDL).

12. The apparatus of claim 11, wherein the computer programming language encodes the function code.

13. The apparatus of claim 12, wherein the model definition data comprises one or more other bindings to one or more other programming languages.

14. The apparatus of claim 10, wherein the at least one interface comprises an Application Binary Interface (ABI).

15. The apparatus of claim 10, wherein the at least one interface comprises a Foreign Function Interface (FFI).

16. The apparatus of claim 10, wherein the steps further comprise deploying the model package for execution of the model.

17. A computer program product disposed upon a non-transitory computer readable medium, the computer program product comprising computer program instructions for standardized model packaging and deployment that, when executed, cause a computer system to carry out the steps of:
generating a model package comprising:
for a model, model definition data that includes a binding to a computer programming language, wherein the model is a trained machine learning model to generate prediction data, wherein the binding enables one or more functions written in the computer programming language to execute one or more portions of the model;
function code that facilitates execution of the model via the binding;
at least one interface for at least one operating system; and
wherein one or more of the model definition data or the function code access one or more runtime dependencies excluded from the model package.

18. The computer program product of claim 17, wherein the model definition data is encoded in a model definition language (MDL).

* * * * *